Aug. 25, 1964 T. H. KLUNE 3,145,592
REPAIR PLUG APPLICATOR FOR TUBELESS TIRES
Filed Feb. 17, 1961

Thomas H. Klune,
INVENTOR.
WHANN & McMANIGAL
Attorneys for Applicant

United States Patent Office 3,145,592
Patented Aug. 25, 1964

3,145,592
REPAIR PLUG APPLICATOR FOR
TUBELESS TIRES
Thomas H. Kluge, 1344 E. 14th St., Apt. E,
Santa Monica, Calif.
Filed Feb. 17, 1961, Ser. No. 90,016
6 Claims. (Cl. 81—15.7)

This invention relates generally to tools for repairing tires of motor vehicles and the like and relates more particularly to tools or devices for installing repair plugs in puncture openings and the like of tubeless tires for motor vehicles.

While the invention has particular utility in connection with the repair of puncture holes and the like in tubeless type tires, and is shown and described in such connection, it is to be understood that its utility is not confined thereto.

Various known problems are involved in the repair of puncture openings and the like of tubeless tires and particularly in the repair of such tires without the necessity of removing the latter from the wheels on which they are mounted.

It is therefore an object of the present invention to provide a tool or device which will solve such problems and overcome the difficulties involved therein.

It is another object of the invention to provide a tool or device of this character with which the repair of such puncture openings is facilitated.

It is still another object of the invention to provide a tool of this character for installing resilient repair plugs in openings of tires whereby said openings are effectively sealed against the escape of air therethrough.

A still further object of the invention is to provide an apparatus or tool with which a sealing plug may be easily and quickly installed in a puncture opening in a tire while the latter is mounted on a vehicle wheel.

A further object of the invention is to provide a tool of this character for holding thin shelled plug installation tubes filled with a sealing plug of resilient material, and with which said plug installation tubes may be inserted in puncture openings or the like and the shells withdrawn while leaving the resilient material in the respective openings.

Another object of the invention is to provide a device of this character whereby such thin walled tubes may be readily forced into a puncture opening in a tire.

Still another object of the invention is to provide a tool or device of this character that is relatively simple in construction and operation.

A further object of the invention is to provide apparatus of this character that is relatively inexpensive to manufacture.

The characteristics and advantages of the invention are further sufficiently referred to in connection with the following detailed description of the accompanying drawings, which represent one embodiment. After considering this example, skilled persons will understand that many variations may be made without departing from the principles disclosed, and I contemplate the employment of any structures, arrangements or modes of operation that are properly within the scope of the appended claims.

Referring to the drawings, which are for illustrative purposes only:

Figure 1:
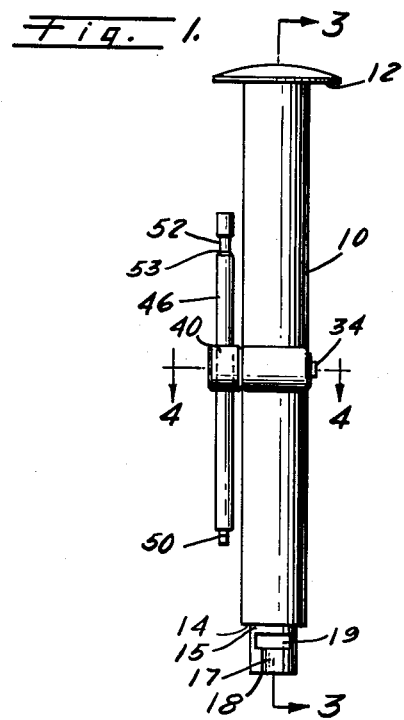
FIG. 1 is a side view of a tool embodying the present invention.

Referring more particularly to the drawings, there is shown a tubular housing 10 closed at one end by a wall 11 and a terminal flange 12. The outer or free side of the flange 12 is convex to better fit into the palm of the operator's hand for the application of longitudinal pressure.

At its opposite end 14 the tubular housing 10 is open and slidably receives a plunger 15 having teeth 16 at one side to comprise a rack.

Plunger 15 is provided at its outer free end with a notch 17 opening longitudinally inwardly from the free end 18 and extending from one side of the plunger.

Spaced inwardly of the end 18 of the plunger the notch 17 is enlarged, as at 19, for reception of the head 20 of a tube or shell 21 operably containing a sealing plug of resilient material, such as disclosed in my copending application for Tube Patching Means, executed January 10, 1961, filed January 16, 1961, Serial No. 82,793. The enlarged portion 19 of the notch or recess for receiving the head 20 of said tube 21 has a configuration corresponding to the shape and size of the head 20 so as to hold the tube 21 in proper axial alignment relative to the plunger 15 and housing 10.

Plunger 15 is provided with an axial bore 24 which communicates at its outer end with the recess 17 and its enlarged portion 19.

Within the bore 25 of the housing 10 there is a rod 26 having its outer end secured in a bore 27 in the outer end wall 11 of said housing 10, said rod 26 extending axially in said bore 25 of the housing and in said bore 24 of the plunger 15, the purpose of said rod being hereinafter more fully described.

Means for actuating the plunger 15 is provided and comprises a pinion 30 extending through an opening 31 in the wall of the housing 10. Pinion 30 is covered by a wall 32 which extends outwardly from the wall of the housing and is formed integrally therewith to define a chamber 33, the teeth of pinion 30 operably meshing with the teeth 16 of the rack portion of plunger 15.

Pinion 30 has an axial stub shaft 34 which extends through an opening 35 provided therefore in an end wall 36 of the chamber 33. At the opposite end of chamber 33 the end wall 37 has a relatively large opening 38 arranged axially relative to the opening 35 for operable reception of a shaft portion 39 of the pinion, said shaft portion 39 being axially arranged relative to the stub shaft 34 but of substantially larger diameter. At the outer end of the enlarged shaft portion 39 there is an enlarged annular boss 40 having a diametrical bore 41 therein. There is also a recess 42 having one end communicating with the diametrical bore 41 and having the opposite end closed, said recess 42 having a spring 44 disposed therein for urging a latching member 45 outwardly toward the bore 41 for engagement with an operating or actuating rod 46. It is to be noted that the opening 38 is of sufficient size to permit the pinion 30 to be inserted therethrough for installation thereof in the chamber 33. A snap ring 47 is releasably received in an annular groove 48 provided therefor in the stub shaft 34 for retention of the actuating means in operable position. The boss 40 is, of course, of greater diameter than the opening 38, so that the inner side of said boss will engage the outer side of the wall 37. Thus the actuating means is held against undesired longitudinal play.

Rod 46 is slidable in the bore 41 and is provided at one end with a reduced diameter portion 50 removably receivable in a recess or bore 51 provided therefor in flange 12. Adjacent the opposite end the rod 46 is provided with an annular groove 52, the inner wall 53 of which is beveled outwardly and away from the opposite wall of said groove to thereby provide a cam surface over which the latching member 45 will pass. Intermediate its ends the rod 46 is provided with another annular groove, indicated at 54, with the wall 55 thereof inclined outwardly and toward the groove 52 and away from the reduced end portion 50 of said rod 46. The purpose of the inclined wall 55 is similar to the purpose of the inclined wall 53.

Operation of the Mechanism

Figure 3:
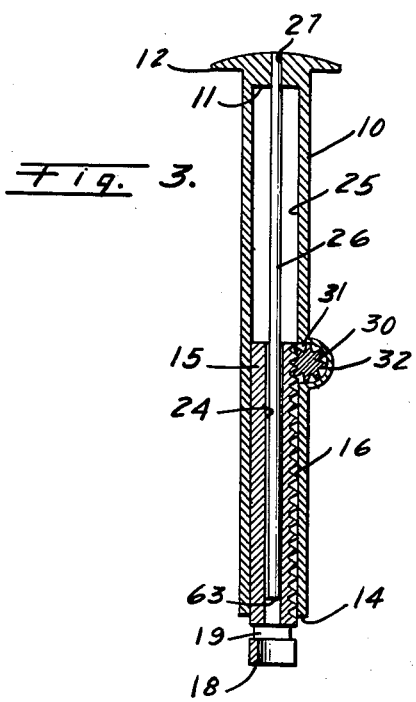
FIG. 3 is a longitudinal sectional view taken on line 3—3 of FIG. 1.
Figure 4:
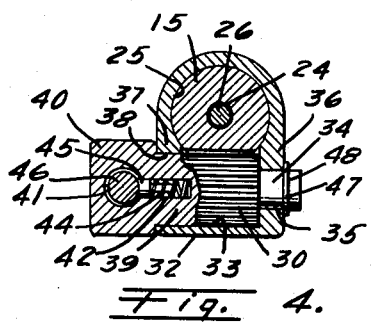
FIG. 4 is a sectional view taken on line 4—4 of FIG. 1.

Preparatory to the repair of the puncture opening 61, which is shown merely by way of example, the rod 46 is moved to the position shown in FIG. 1 whereat the recess or detent 54 receives the latch member 45 and releasably holds the rod in said position. The plunger 15 is moved outwardly a sufficient distance, such as shown in FIGS. 1 and 3, to permit insertion of the head 20 and adjacent portion of tube 21 in the notch portions 19 and 17, respectively. It is to be noted that at this time the free end 63 of rod 26 is spaced from the head receiving portion 19 of the notch 17, said end 63 also being spaced inwardly of the end 14 of the housing 10.

Figure 2:
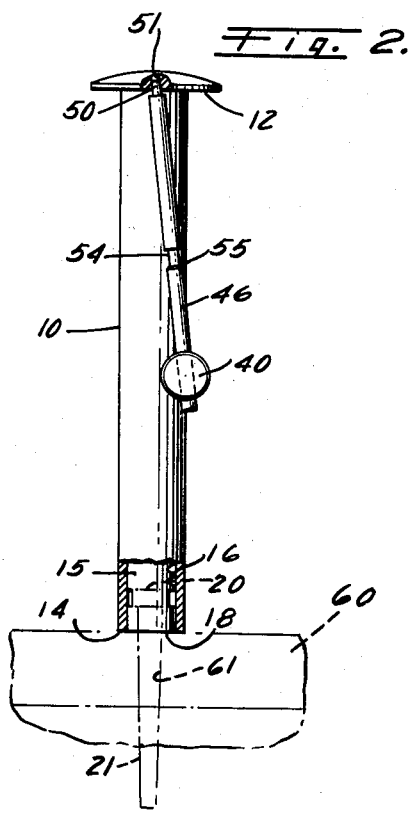
FIG. 2 is a similar view of said tool viewed at right angles relative to the view shown in FIG. 1, portions of the tool being broken away.

After insertion of the head 20 and the adjacent portion of tube 21 in the notch portions 19 and 17, the rod 46 is actuated to rotate the pinion 30 in a direction to move the plunger inwardly in the bore 25 of housing 10 to a position, FIG. 2, whereat the enlarged head receiving portion 19 of the notch 17 is disposed within the bore 25 of the housing and said head 20 and tube 21 are held firmly in axial alignment with respect to the plunger 15 and housing 10.

The rod 46 is so oriented that when the plunger is in the position shown in FIG. 2 the reduced diameter portion 50 of the rod is receivable in the opening 51 of flange 12 and when said portion 50 is disposed in the opening 51 the groove 52 is positioned for reception of the latch member 45 so that the rod 46 will be releasably retained in the position shown in FIG. 2.

When the parts of the mechanism are disposed as shown in FIG. 2, the operator may readily hold the tool so as to force the tube 21 into the puncture opening 61. In exerting longitudinal pressure the operator places the palm of his hand against the flange 12 to thereby provide more effective longitudinal pressure on the tube 21. With the tube 21 inserted in the puncture opening 61 in the wall of the tire 60, FIG. 2, and the free or forward end 14 of the housing abutting the outer surface of said tire, the rod 46 is urged downwardly, as shown in the drawings, whereupon the latch member 45 will ride up the inclined wall 53 so that the rod 46 will slide downwardly until the latch member 45 enters the groove 54 to releasably retain said rod 46 in the position shown in FIG. 1. The rod is then actuated to rotate the pinion 30 for effecting further inward movement of the plunger 15. As the plunger 15 moves inwardly in the bore 25 the free end 63 of rod 26 will engage the adjacent end of a plug or pressure member disposed in the passage to the tube 21 and as said plunger 15 moves further into the bore 25 the plug exerts pressure on the resilient material in the passage of tube 21 to force said material from the inner end of said tube which is being pulled outwardly of the tire. As the tube 21 is pulled from the tire said resilient material is disposed in the puncture opening 61 for sealing same, said resilient material forming a sealing plug which is squeezed tightly in the puncture opening but which has expanded end portions which aid in retaining the plug in said puncture opening.

It is thought that the invention and its attendant advantages will be understood from the foregoing description and that it will be apparent that various changes may be made in the form, construction an arrangement of the parts of the invention without departing from the spirit and scope thereof or sacrificing its material advantages, the embodiment hereinbefore described being merely for purposes of illustration.

I claim:

1. A repair plug applicator for tubeless tires and the like: a tubular housing having a bore therein closed at one end by a housing end wall and open at the opposite end, said housing having a transverse opening therethrough intermediate the ends thereof and an axial opening in said end wall; a rounded wall and end walls defining a chamber at the outer side of said transverse opening, one end wall of said chamber having a shaft opening therethrough and the other end wall having a relatively larger opening coaxial with the shaft opening; a radially extending annular flange at the closed end of the housing, said flange having a recess therein; a plunger movable longitudinally in the interior passage of said tubular housing, said plunger having an axial passage therethrough and having teeth along one side defining a rack, the outer end portion of said plunger having a notch extending from the free end and from one side, said notch having the inner side arcuate, the arcuate part of said notch having its radius based on the axis of said plunger, said notch having an enlarged inner end portion for removable reception of the head of a sealing plug tube, the smaller part of said notch being adapted to removably receive an adjacent portion of said tube; a pressure rod in said housing having its inner end secured in the axial opening in the end wall of said housing and extending axially in said housing and in the plunger passage for entrance into the enlarged part of said notch when the plunger is moved inwardly to a predetermined position; means for longitudinally actuating said plunger including a rotatable member having a pinion gear at one end operably mounted in said chamber and transverse opening with its teeth meshing with the teeth of said rack; a stub shaft at the free end of said gear, said shaft being operably mounted in the first mentioned opening in an end wall of said chamber, said rotatable member being received in the large opening in the opposite end wall of said chamber; a boss at the outer end of said member and of greater diameter, said boss having a diametrical opening therethrough; means on said shaft releasably locking said rotatable member in the chamber; a rod slidable in the diametrical opening in the boss, said rod having a reduced end portion removably receivable in the recess in the flange of said housing, an annular groove adjacent the other end of the rod, and an annular groove intermediate said ends; a latch member in said boss releasably receivable in said grooves; and a spring urging said latch member toward said diametrical bore in the boss.

2. A repair plug applicator for tubeless tires and the like: a tubular housing having a bore therein closed at one end by a housing end wall, and open at the opposite end, said housing having a transverse opening therethrough intermediate the ends thereof; means defining a chamber at the outer side of said transverse opening, a radially extending annular flange at the closed end of the housing, said flange having a recess therein; a plunger movable longitudinally in the interior passage of said tubular housing, said plunger having an axial passage therethrough and having teeth along one side defining a rack, the outer end portion of said plunger having a notch extending from the free end and from one side, said notch having the inner side arcuate, the arcuate part of said notch having its radius based on the axis of said plunger, said notch having an enlarged inner end portion for removable reception of the head of a sealing plug tube, the smaller part of said notch being adapted to removably receive an adjacent portion of said tube; a pressure rod operably secured in said housing and having a portion received in the plunger passage, the free end of said rod entering the enlarged part of said notch when the plunger is moved inwardly to a predetermined position; means for longitudinally actuating said plunger including a rotatable member having a pinion gear at one end rotatably mounted in said chamber and transverse housing opening with its teeth meshing with the teeth of said rack; said rotatable member including a boss at the outer end thereof and said boss having a diametrical opening therethrough; an actuating rod slidable in the diametrical opening in the boss, said rod having a reduced end portion removably receivable in the recess in the flange of said housing; and latch means for releasably securing said actuating rod in a position whereat the reduced end portion is in said recess, and also releasably securing said rod in a central position relative to said boss.

3. A repair plug applicator for tubeless tires and the like, comprising: a tubular housing having a bore therein closed at one end by a housing end wall and open at the opposite end, said housing having a transverse opening therethrough intermediate the ends thereof; wall means covering said transverse opening and defining a chamber at the outer side of said transverse opening; a radially extending annular flange at the closed end of the housing, said flange having a recess therein; a plunger movable longitudinally in the interior passage of said tubular housing, said plunger having an axial passage therethrough and having teeth along one side defining a rack, the outer end portion of said plunger having a notch extending from the free end and from one side for reception of the head and adjacent part of a sealing plug tube; pressure means secured to said housing and extending into the passage in the plunger for entering said notch and said sealing plug tube when the plunger is moved inwardly beyond a predetermined position; means for longitudinally actuating said plunger including a rotatable member having a pinion gear at one end operably mounted in said chamber and transverse opening with its teeth meshing with the teeth of said rack; said rotatable member having a boss at its outer end, said boss having a diametrical opening therethrough; an operating rod slidable in the diametrical opening in the boss and adapted to be moved longitudinally in said diametrical opening; means for releasably securing said operating rod in a position where its end portion engages the recess in the flange; and means for releasably securing said operating rod in another position for actuating said gear.

4. In a repair plug applicator for tubeless tires and the like, comprising: a tubular housing having a bore therein open at one end, said housing having a transverse opening therethrough intermediate the ends thereof; wall means covering said transverse opening and defining a chamber at the outer side of said transverse opening; a plunger movable longitudinally in the interior passage of said tubular housing, said plunger having an axial passage therethrough and having teeth along one side defining a rack, the outer end portion of said plunger having a socket for operable reception of the head and adjacent part of a sealing plug tube; pressure means secured to said housing and extending into the passage in the plunger for entering said socket and said sealing plug tube when the plunger is moved inwardly beyond a predetermined position; means for longitudinally actuating said plunger including a rotatable member carrying a pinion gear operably mounted in said chamber and transverse opening with its teeth meshing with the teeth of said rack; said rotatable member having a transverse opening therethrough; an operating rod slidable in the transverse opening in said rotatable member and adapted to be moved longitudinally in said transverse opening; means for releasably securing said operating rod in a generally central position for actuating said rotatable member and gear thereof; and means for releasably securing said operating rod in another position for holding said rotatable member and gear thereof against rotation when said operating rod is slidably moved to the latter position.

5. In an applicator for installing plugs in puncture holes of tubeless tires and the like, wherein said plugs are disposed in tubes having heads with projections thereon: a tubular housing having a bore therein open at one end, said housing having a transverse opening therethrough intermediate the ends thereof; wall means covering said transverse opening and defining a chamber at the outer side of said transverse opening; a plunger movable longitudinally in the interior passage of said tubular housing, said plunger having an axial passage therethrough and having teeth along one side defining a rack, the outer end portion of said plunger having a socket extending from the free end and from one side for operable reception of the head of a sealing plug tube and engagement with projections thereof to hold same against rotation relative to said plunger; pressure means secured to said housing and extending into the passage in the plunger for entering said socket and said sealing plug tube when the plunger is moved inwardly beyond a predetermined position; means for longitudinally actuating said plunger including a rotatable member carrying a pinion gear operably mounted in said chamber and transverse opening with its teeth meshing with the teeth of said rack; said rotatable member having a transverse opening therethrough; an operating rod slidable in the transverse opening in said rotatable member; means for engaging a part of said operating rod intermediate the ends thereof and releasably securing said operating rod in a position for actuating said gear; and means for releasably securing said rod in another position by slidably moving same in the transverse opening in said rotatable member and thereby releasably hold said rod against movement which would effect rotatable movement of said rotatable member.

6. In an applicator for installing plugs in puncture holes of tubeless tires and the like, wherein said plugs are disposed in tubes having longitudinally extended heads thereon: a tubular housing having a bore therein open at one end, said housing having a transverse opening therethrough intermediate the ends thereof; wall means covering said transverse opening and defining a chamber at the outer side of said transverse opening; a plunger movable longitudinally in the interior passage of said tubular housing, said plunger having an axial passage therethrough and having teeth along one side defining a rack, the outer end portion of said plunger having a socket extending from the free end and from one side for lateral insertion and operable reception of the head of a sealing plug tube, the closed portion of the socket having substantially the same shape and being large enough to operably receive said head of a sealing plug tube; pressure means secured to said housing and extending into the passage in the plunger for entering said socket and said sealing plug tube when the plunger is moved inwardly beyond a predetermined position; means for longitudinally actuating said plunger including a rotatable member carrying a pinion gear operably mounted in said chamber and transverse opening with its teeth meshing with the teeth of said rack; means for rotating said rotatable member; and means for holding said rotatable member against rotation.

References Cited in the file of this patent
UNITED STATES PATENTS

| | | |
|---|---|---|
| 529,765 | Weyhe | Nov. 27, 1894 |
| 686,908 | Schermack | Nov. 19, 1901 |
| 1,607,667 | Essen | Nov. 23, 1926 |
| 1,670,210 | Parker | May 15, 1928 |
| 1,693,261 | Sweetland | Nov. 27, 1928 |
| 1,812,096 | Jameson | June 30, 1931 |
| 2,519,536 | Barbagelata | Aug. 22, 1950 |
| 2,828,657 | Fromberg | Apr. 1, 1958 |
| 2,920,515 | Mays | Jan. 12, 1960 |
| 2,966,190 | Nowotny | Dec. 27, 1960 |
| 3,052,141 | Mitchell | Sept. 4, 1962 |